United States Patent [19]
Liberty, Jr.

[11] 3,739,892
[45] June 19, 1973

[54] REPLACEABLE ANNULAR GEAR

[76] Inventor: Joseph C. Liberty, Jr., 4216 Grindley Place, Dearborn Heights, Mich. 48125

[22] Filed: July 30, 1971

[21] Appl. No.: 167,640

[52] U.S. Cl. ............ 192/67 R, 192/48.91, 192/108, 29/159.2, 29/401, 74/447
[51] Int. Cl. ...................... F16d 11/10, B21d 53/28
[58] Field of Search ...................... 192/48.91, 67 R, 192/108, 114 T; 74/446, 447; 29/159.2, 401

[56] References Cited
UNITED STATES PATENTS

| | | | |
|---|---|---|---|
| 2,125,526 | 8/1938 | Trimbath | 192/67 R X |
| 2,832,234 | 4/1958 | Sinclair | 192/67 R X |
| 3,219,164 | 11/1965 | Henyon | 192/114 T |
| 3,083,585 | 4/1963 | Dawe et al. | 74/243 |
| 3,230,616 | 1/1966 | Janssen | 29/401 |
| 3,490,132 | 1/1970 | Kosters et al. | 29/401 |

*Primary Examiner*—Allan D. Herrmann
*Attorney*—Allan J. Murray

[57] ABSTRACT

Worn teeth in a shifting transmission are replaced by an annular replacement gear which is slipped over the worn teeth after they have been ground down to a smooth annulus. The teeth of the annular replacement gear are longer than the worn teeth that they replace.

2 Claims, 7 Drawing Figures

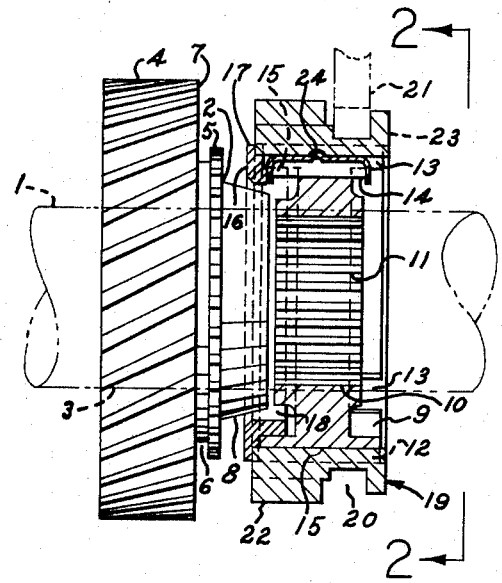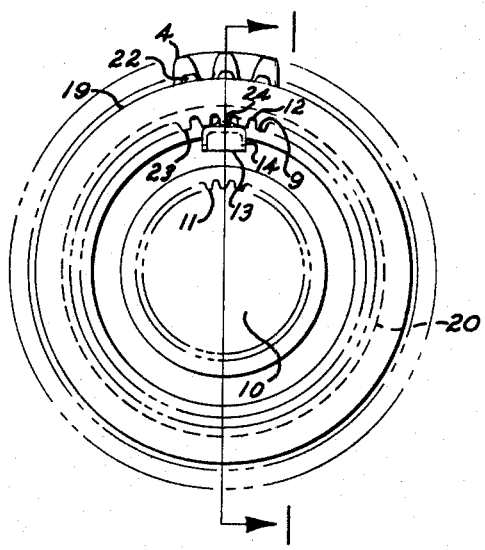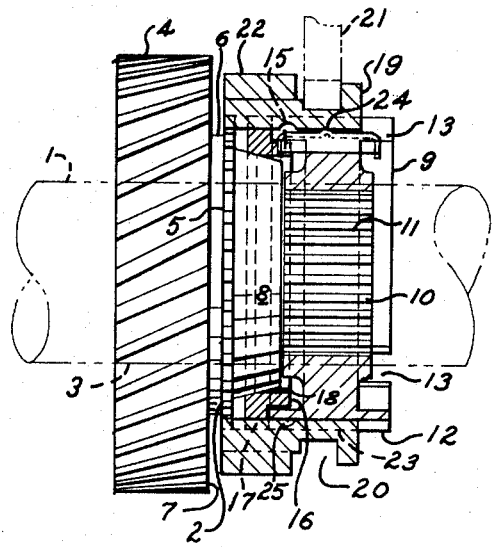

INVENTOR
JOSEPH C. LIBERTY JR.
BY Allan J. Murray
ATTORNEYS

REPLACEABLE ANNULAR GEAR

FIELD OF INVENTION

The field of invention lies in the area of improved gears for transmissions for the transmission of driving power, such as is found in automobiles and the like.

BACKGROUND OF INVENTION

In the conventional manually shifted form of automobile transmission, it is common to form, integrally on one hub, two annular gears, spaced apart on said hub, and frequently of substantially different diameters and tooth dimensions. Said hub is rotatably mounted on a drive shaft, and commonly is flanked by snap rings to resist movement of the hub longitudinally of the shaft. Of this dual gear (hereinafter called the driving gear) the larger gear receives a constant drive during operation of an automobile, as from a cluster gear on a countershaft (not shown).

Said constant drive serves merely to rotate the gear freely on the drive shaft, until it is interconected with the drive shaft by a synchronizer assembly. Such synchronizer assembly is disposed on the drive shaft adjacent to the driven gear, and may include an interiorly splined clutch hub mounted upon a splined portion of the drive shaft to transmit a positive drive to the drive shaft. The exterior circumferential surface of the clutch hub is formed with a set of gear teeth. Mounted upon said exterior circumferential surface is an annular sleeve gear (hereinafter referred to as the driven gear) having its interior diameter formed with teeth which mesh with the clutch hub teeth. The engagement of the driven gear upon the clutch hub is such that the driven gear is afforded reciprocable sliding travel on said hub, so that it may be slid, as by a shifting fork, to telescopically engage its interior gear teeth with the second, smaller set of gear teeth on said driving gear. It may now be apparent, that the last described engagement completes a positive drive from the driving gear through the driven gear to the clutch hub, and thence to the drive shaft. (The terms "first" and "second" gear are used only to distinguish the two gears on the driving gear, and do not refer to first, second, and third gear speeds of a conventional transmission).

To facilitate shifting, which is the engagement or disengagement of the driven gear with the said second gear of the driving gear, it has been customary to complete the synchronizer assembly with a ring, usually made of brass, having some slight floating travel longitudinally of the drive shaft. As illustrated in a rather elementary manner in the drawings, and particularly in FIGS. 1, 2, and 3, the circumferential extent of the clutch hub gear is interrupted by three radially, equally spaced notches, and the brass ring is further provided with corresponding notches, so that a key may interengage the brass ring with the clutch hub and still afford the necessary floating travel. It may be noted, again as illustrated in FIGS. 1 and 2, that a portion of the hub of the drive gear is tapered to form a truncated cone, upon which the brass ring frictionally engages to receive an initial drive which is intended to bring the speed of rotation of the driven gear to a speed corresponding to that of the driving gear prior to the engagement of the aforesaid interior teeth of said driven gear with said second gear on the driving gear.

In the sport of racing stock cars, to further facilitate the speed with which a transmission may be shifted from one gear to another, it has been a popular custom to remove, as by grinding, a desired number of teeth from the interior of the driven gear, and to remove from the second gear on the driving gear, a corresponding number of teeth. This practice affords the elimination of the above described brass ring as well as the keys, and spring wire clips (not shown) which retain the keys in assembly. The greater spacing between the remaining teeth on the interior of the driven gear, and the teeth of said second gear of the driving gear, affords greater ease of shifting without the need of the synchronizing ring, and of course, the fewer the number of teeth remaining on the engaging gears, the faster and easier it is to engage the gears to transmit a drive to the drive shaft.

A further consequence of this custom is, however, that the driven gear engages a rotating driving gear without the benefit of the synchronizer, and as the speeds of the two gears may be considerably disparate, the remaining gear teeth in both gears are subjected to substantial impact upon engagement. Consequently the second gear on the driving gear, once it is altered in the aforesaid manner, may last for only 25 races (for example) before the teeth on said second gear are so worn and broken as to require replacement of the gear.

SUMMARY AND OBJECT OF THE INVENTION

Improvement resides in the repair, and the method of repair and improvement, of a driving gear comprising a hub rotatably mountable upon a drive shaft, and formed with a first annular gear spaced from a second annular gear, the second annular gear being of smaller overall diameter than the first gear, and having teeth of substantially smaller dimensions, and consequently more subject to breakage and wear; repair is effected by grinding or otherwise removing the worn gear teeth of the second gear to leave an annular surface of predetermined diameter intersecting the plane of the adjacent lateral face of said first gear and applying on said annular surface, an annulus, having an interior diameter corresponding to said annular surface, and having a desired, predetermined number of teeth upon its exterior circumferential surface, and securing the annulus in place as by tack welding, or any other convenient means; the width of said annulus is such that one lateral face thereof abuts said adjacent lateral face of said first gear, and the opposite lateral face of said annulus occupies a plane approximately one-sixteenth of an inch from the opposing lateral face of said driven gear, whereby the gear teeth of the annulus are substantially longer and stronger than the worn teeth they replace. Further a metal of superior shock resistant characteristics can be employed in the annulus. Thus the best materials can be selected for both the driving gear and the annulus.

An object of the invention is to provide an economical and improved gear, and method of repairing and improving said gear to replace worn teeth with teeth of greater width, and consequently of greater strength.

This and various other objects are attained by the invention hereinafter described and illustrated in the accompanying drawings, wherein:

FIG. 1 is an elevational view in partial section taken on line 1—1 of FIG. 2, of a dual gear rotatably mounted upon a drive shaft, and having longitudinally adjacent thereon a synchronizer assembly, of which the sleeve, or driven, gear is portrayed in a neutral position wherein no drive is transmitted from the driving gear through the synchronizing assembly.

FIG. 2 is an elevational end view of the gears taken on line 2—2 of FIG. 1.

FIG. 3 is a view similar to FIG. 1, but with the synchronizer sleeve gear shown in engagement with the second gear of the driving gear to receive a drive therefrom and transmit said drive through the clutch hub to the drive shaft.

Figure 4:
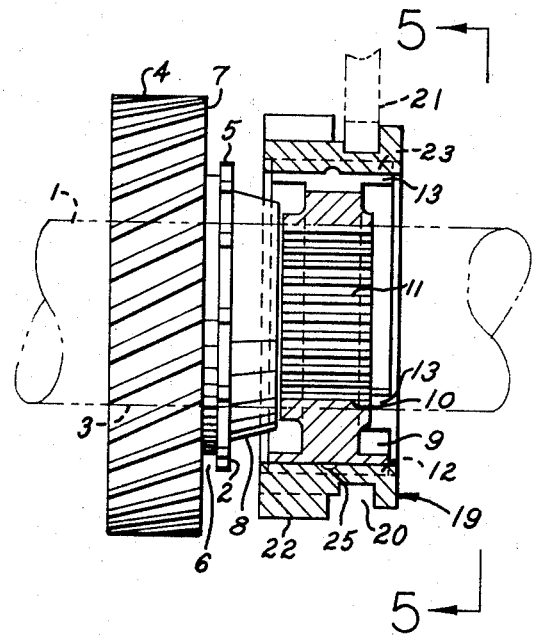
FIG. 4 is a view similar to FIGS. 1, and 3, illustrating the modified form of the driving gear, and of the driven gear with a number of teeth removed from each, and with the brass synchronizing ring and the keys also eliminated from the assembly.

In these views the reference character 1 designates a drive shaft of an automobile transmission, said shaft being shown in phantom line to avoid obscuring of the hereinafter described features. A hub 2 is rotatably received upon the shaft, being formed with a hole 3 for this purpose, with a first, larger gear 4, and a second gear 5, of smaller diameter. Said gears are spaced apart axially of said sleeve by a groove 6, which exists mainly due to the exigencies of manufacture, as it would be difficult and expensive to machine the teeth in the smaller ler second gear so that they would intersect the plane of the adjacent lateral face 7 of the larger first gear 4. (The terms first and second gear are used merely to distinguish the two gears on the dual gear and are without reference to the various speed gears in transmission). The gear 3 receives a constant drive (not shown) as from a gear mounted on a countershaft, as is conventional in automotive transmissions. The hub 2 terminates in an exterior tapered cone.

As the large gear 4 is subjected to a continual drive, but rotates freely upon the shaft, naturally, some means is required to transmit said drive, when desired, to the drive shaft. This is effected by the provision of the clutch hub 9 formed with a hole 10 whereon it is rigidly secured to the drive shaft, frequently as by splines 11. The clutch hub is formed with an exterior, annular set of gear teeth 12, which is interrupted by slots 13. Keys 14 are received in said slots, and have an end portion engaged in a notch 15 in synchronizing ring 16. The synchronizing ring is formed with gear teeth 17 which correspond in size to the teeth of the small gear 5.

Mounted upon the clutch hub 9, is a sleeve gear 19 formed with an annular groove 20 which may receive a shifting fork 21 shown in phantom line. Said sleeve gear may incorporate external gear teeth 22, and is always formed with internal gear teeth 23 to slidably mesh with the teeth 12 of the clutch hub 9. In some versions of the above described device, the keys are stamped from sheet metal and are formed with the detent 24 which is received in detent notches 25 formed in the interior gear teeth 22 on the sleeve gear 19. The detent serves initially to carry the key in the direction of sliding travel effected by the shifting fork 21. A circular hole 26 on the synchronizing ring 16 engages the surface of the cone 8, and a frictional drive is transmitted to the sleeve gear 19, and from thence to the clutch hub 9, and to the drive shaft 1, to bring rotative travel of the sleeve gear matching that of the driven gear, to facilitate meashing of the interior teeth 23 of the sleeve gear with the teeth of the small gear 5 formed on the hub 9, as illustrated in FIG. 3.

Figure 5:
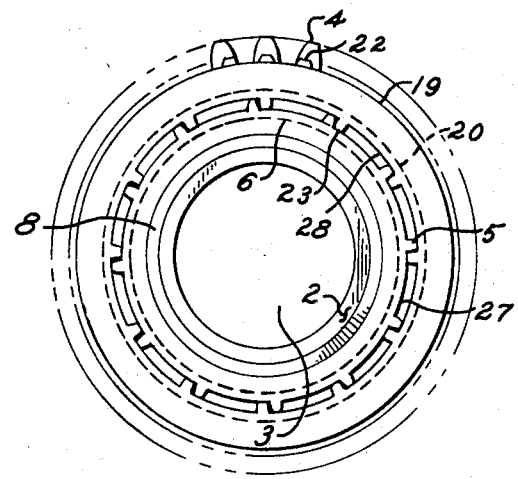
FIG. 5 is a vertical, elevational view on line 5—5 of FIG. 4, with the clutch hub removed, to more clearly illustrate the results of removal of gear teeth in the manner aforesaid on both the second gear of said driving gear, and on the interior gear of said driven gear.
Figure 6:
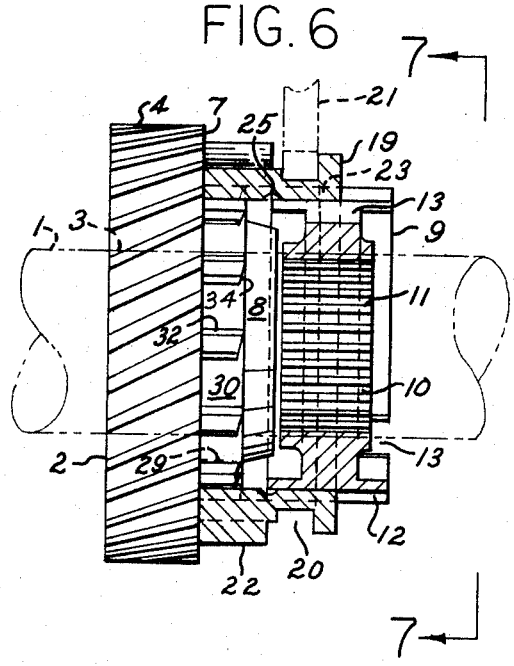
FIG. 6 is a view similar to FIGS. 1, 3, and 4, illustrating the driving gear with all of the worn or broken teeth ground away, and replaced by the aforesaid specially prepared annulus, or ring gear.
Figure 7:
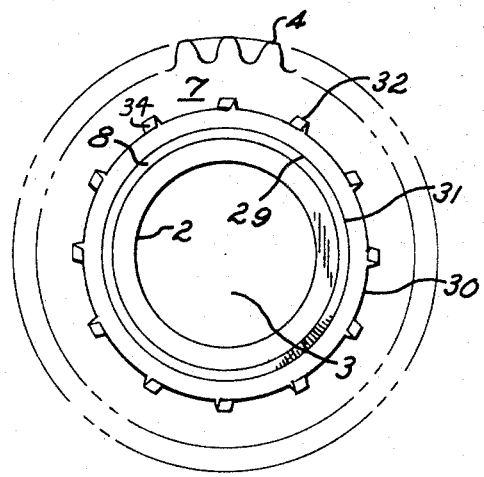
FIG. 7 is an elevational end view of the improved driving gear showing the annulus (with the new gear teeth thereon) attached to said annular surface, as such view might appear if taken on line 7—7 of FIG. 6, but omitting the clutch hub and sleeve gear for clarity.

As stated earlier, and as illustrated in FIGS. 4 and 5, for racing purposes, a predetermined number of teeth are removed, as by grinding as shown at 27 on the small gear, and a corresponding number of teeth are removed, as designated at 28, from the interior gear teeth 22 of the sliding sleeve gear 19. As aforesaid, this measure affords elimination of the synchronizing ring 16, of the keys 14, and of key retaining springs (not shown). While this provision affords faster shifting, which is of considerable importance in the sport of racing stock cars, as stated earlier, it imposes a rather short life span on the remaining teeth, and this is particularly true of the relatively small teeth on the small gear 5.

Past practice has been to replace the gear 2, 4, 5 with a new gear when the teeth of the small gear 5 are deteriorated beyond useful function, but again, the number of teeth would be ground away from the new gear 5 of the replacement gear, and again, the life span of the gear is shortened.

It has been determined that the life of gear 2, 4, 5 may be extended substantially, by the measure of grinding away the worn and broken teeth of the gear 5, it being desired to also remove an amount of metal from the hub to produce an annular surface 29. It is to be noted that the annular surface intersects the adjacent lateral face 7 of the larger gear 4. An annulus 30 is then prepared, having an interior diameter 31 corresponding to that of the annular surface 29, which annulus is then fitted upon said annular surface, and may be secured in position as by tack welding or by any other such means which will afford its subsequent removal. A desired number of teeth 32, corresponding to the number of interior gear teeth 23 remaining on the sleeve gear 19, are formed on the exterior circumference of the annulus, to replace the broken and worn teeth of the small gear 5, which were removed.

It is a decided advantage on the improved gear that the length of the gear teeth 32 can extend for the full width of the annular surface 29, and may abut the aforesaid adjacent lateral face 7 of the large gear 4, as this greater length also gives the teeth greater strength, and consequently gives the gear a longer life after the addition of the annulus 30, than it would have had subsequent to its modification to facilitate shifting, but prior to the addition of said annulus.

A further, and important feature of the invention is the provision, as at 34, of an angular surface ground on the end of each tooth 32 to effect a camming action when the teeth engage with the corresponding teeth of the sleeve gear 19. As may be perceived, such camming action would facilitate engaging the said corresponding teeth, and would go far toward having such teeth engage smoothly as they intermesh, to reduce the shock, and consequently, wear and destruction of the teeth on the newly applied annulus.

What I claim is:

1. A power transmission device, including,
a drive shaft,
a driving gear having an annular hub, rotatably mounted on said drive shaft,
a first annular gear integral with said annular hub,
at least one plane, annular, lateral face, formed on said first annular gear, concentric therewith,
a clutch rigidly secured upon said shaft adjacent to said annular hub, and having an exterior, circumferential surface,
exterior gear teeth formed on said circumferential surface, and
a drivable, annular sleeve gear mounted on said clutch hub and having interiorly formed gear teeth to mesh in axially slideable engagement with said exterior teeth, whereby a drive may be transmitted from said sleeve gear through said clutch hub to said shaft, of
a second annular gear carried by said annular hub to transmit a drive to said annular sleeve gear,
said second annular gear having teeth formed of an annulus, having opposite parallel side surfaces, and having a predetermined interior diameter, the length of said teeth extending the width of said annulus,
an annular surface formed on said annular hub and extending axially and transversely to, and intersecting, said lateral face of said first annular gear, said annular surface rigidly receiving said annulus, and
said annulus being disposed to abut one said parallel side surface against said lateral face of said first annular gear, so that one end face of each tooth abuts said lateral face, and
said sleeve gear having at least one plane lateral face and being axially slideable on said clutch hub to engage said interiorly formed gear teeth with said teeth of said annulus, and to abut said last mentioned lateral face against said first mentioned lateral face whereby to engage the full length of said teeth of said annulus, and to resist further sliding travel of said clutch hub.

2. The method of replacing an annular set of teeth on a gear, wherein said gear includes a hub with a first annular gear formed thereon, said first annular gear having at least one plane, lateral, annular face, and a second gear formed on said hub of smaller diameter than said first gear, and spaced therefrom by an annular groove, and wherein said smaller diameter gear is formed with teeth of smaller dimensions than said first annular gear, and subject to rapid wear, said method including the steps of removing the worn teeth of the second gear in such a manner as to provide an annular surface of predetermined diameter, formed to intersect with said lateral face, forming an annulus having an interior diameter corresponding to and receivable upon said annular surface, and having opposite lateral faces, securing said annulus in a desired position on said annular surface so that one lateral face of said annulus abuts said lateral face of said gear, and the opposite lateral face of said annulus occupies a plane outwardly of the corresponding lateral face of the removed worn teeth, and forming on the exterior surface of said annulus a predetermined number of gear teeth of predetermined dimensions, the length of said gear teeth extending the width of said annulus.

* * * * *